United States Patent Office 3,453,348
Patented July 1, 1969

3,453,348
ESTERS OF PENTAVALENT PHOSPHORUS ACIDS AND PRODUCTION THEREOF
Michel Charles Demarcq and Joseph-Joachim Sleziona, Lyon, France, assignors, by mesne assignments, to Ugine Kuhlmann (societe anonyme), Paris, France, a corporation of France
No Drawing. Filed Dec. 29, 1964, Ser. No. 422,043
Claims priority, application France, Dec. 31, 1963, 959,019; Sept. 14, 1964, 988,060
Int. Cl. C07f 9/08, 9/16, 9/28
U.S. Cl. 260—963
9 Claims

ABSTRACT OF THE DISCLOSURE

Phosphoric esters of the formula $$\begin{array}{c} A \\ \diagdown \\ A' \end{array} \!\! \overset{Y'}{\underset{\parallel}{P}} \!\!-\! Y \!-\! \underset{|}{\overset{Z}{\underset{Z'}{C}}} \!\!-\! \underset{|}{\overset{Z'''}{\underset{Z''}{C}}} \!\! X$$

wherein A and A′ are alkyl, alkoxy, aryl or aryloxy having a total of 2 to 22 carbon atoms therein, Y′ and Y are oxygen or sulfur, Z, Z′, Z″ and Z‴ are hydrogen, alkyl or chloroalkyl having a total of not more than 10 carbon atoms therein and X is chlorine or bromine produced by condensing a tautomer of the formula $$\begin{array}{c} A \\ \diagdown \\ A' \end{array} \!\!\! \overset{Y'}{\underset{|}{P}} \!\!-\! H \quad \text{or} \quad \begin{array}{c} A \\ \diagdown \\ A' \end{array} \!\!\! P \!\!-\! Y' \!\!-\! H$$

with a compound of the formula $$Z \!-\! \underset{\diagdown}{\overset{Z'''}{\underset{|}{C}}} \!\!-\!\!-\!\! \underset{Y}{\overset{Z''}{\underset{|}{C}}} \!\!-\! Z'$$

and halogenated hydrocarbon, which esters are useful as lubricant additives, plasticizers, insecticides, fungicides, etc.

---

This invention relates to a method of obtaining esters of pentavalent phosphorus acids and more particularly phosphoric esters of the general formula:

$$\begin{array}{c} A \\ \diagdown \\ A' \end{array} \!\! \overset{Y'}{\underset{\parallel}{P}} \!\!-\! Y \!-\! \underset{|}{\overset{Z}{\underset{Z'}{C}}} \!\!-\! \underset{|}{\overset{Z'''}{\underset{Z''}{C}}} \!\! X \quad (\text{I})$$

in which A and A′ represent individually radicals R, R′ or groups RO, R′O, RS, R′S, or RR′N, R and R′, which may be identical or different, each representing a hydrogen atom, a saturated or unsaturated aliphatic or cyclic hydrocarbon radical, possibly substituted by halogen atoms, alcohol, ester or ether oxide functions, or nitrogen or phosphorus containing groups, R and R′ further possible being the monovalent extremities of a glycol or polyol of the type HO—R—R′—OH; Y and Y′ represent individually an oxygen or sulfur atom; Z, Z′, Z″, and Z‴, which may be identical or different, represent hydrogen or halogen atoms, or monovalent aliphatic or cyclic, saturated or unsaturated, halogenated or unhalogenated radicals; X is a halogen atom.

Certain known compounds derived from pentavalent phosphorus may be represented by a general formula similar to Formula I. Such known compounds are generally prepared in the following manner:

A halide such as dialkylphosphoryl chloride of Formula II hereafter is condensed:

Either with an alcohol of Formula III hereafter in or without the presence of a basic reagent capable of neutralizing the halohydric acid formed by condensation.

Or with an epoxide compound of Formula IV hereafter using a catalyst or not.

The respective formulae of the above mentioned compounds II, III and IV being:

$$\begin{array}{c} RO \\ \diagdown \\ R'O \end{array} \!\!\! \overset{O}{\underset{\parallel}{P}} \!\!-\! X \qquad HO \!-\! \underset{|}{\overset{Z}{\underset{Z'}{C}}} \!\!-\! \underset{|}{\overset{Z''}{\underset{Z'''}{C}}} \!\! X \qquad \underset{Z'}{\overset{Z}{\diagdown}} \!\! C \!\!-\!\!-\!\! C \!\! \underset{Z'''}{\overset{Z''}{\diagup}}$$
(II)           (III)                (IV)

in which R, R′, Z, Z″, Z‴ and X have the same meaning as above.

However, the known methods of preparation have substantial disadvantages. In the first place the use of an acid halide of Formula II hereabove as a reaction component gives rise to considerable practical difficulties, since such halides have a corrosive action on the metals normally used for the manufacture of industrial apparatus.

Furthermore, compounds of Formula II have a tendency to disproportionation of the type according to the following reaction:

$$(1) \quad 2 \begin{array}{c} RO \\ \diagdown \\ R'O \end{array} \!\!\! \overset{O}{\underset{\parallel}{P}} \!\!-\! X \; \leftrightarrows \; \begin{array}{c} RO \\ \diagdown \\ X \end{array} \!\!\! \overset{O}{\underset{\parallel}{P}} \!\!-\! X + \begin{array}{c} RO \\ \diagdown \\ R'O \end{array} \!\!\! \overset{O}{\underset{\parallel}{P}} \!\!-\! OR'$$

Consequently when a compound II condenses with products III or IV a single phosphoric ester I is not obtained, but a mixture of the desired ester I with by-products resulting from the condensation of compounds III or IV with the products of the disproportionation of the acid halide II. In order to eliminate said by-products it is necessary to submit the reaction mixture to long and costly fractionating, and to isolate phosphoric ester I.

An object of our invention is to provide a method for the manufacture of phosphoric esters of the above mentioned type, by means of which the desired phosphoric ester or definite desired mixed esters may be obtained alone; without the necessity of isolating the said ester or esters from a reaction mixture.

Another object of the invention is to provide a method for the manufacture of such phosphoric esters which may easily be carried out on a commercial scale and in which corrosion hazards in the apparatus employed are reduced to a minimum.

These and other objects will be fully apparent from the following specification.

According to the invention at least one compound of Formula V hereafter, containing radical >PY′H and having two tautomeric forms (Va) and (Vb):

$$(\text{V}):(\text{V}a) \qquad \begin{array}{c} A \\ \diagdown \\ A' \end{array} \!\!\! \overset{Y'}{\underset{\parallel}{P}} \!\!-\! H \qquad \begin{array}{c} A \\ \diagdown \\ A' \end{array} \!\!\! P \!\!-\! Y'H$$
(Vb)

is reacted with a compound of formula:

$$(\text{VI}) \qquad \underset{Z'}{\overset{Z}{\diagdown}} \!\! C \!\!-\!\!-\!\! C \!\! \underset{Z'''}{\overset{Z''}{\diagup}}$$

and a halogenated compound of formula XD, A, A′, Y, Y′, Z, Z′ Z″, Z‴ and X, having the same meaning as above, and D representing a monovalent, aliphatic or cyclic, saturated or unsaturated radical preferably containing one or more halogen atoms, the reaction being carried out at a temperature between 0 and 250° C., and preferably between 20 and 120° C., in the presence or absence of a catalyst.

In the most simple instance the reaction according to the invention leads to the formation of the desired ester and of a hydride HD corresponding to halide XD used at the start.

The reaction can then be written as follows:

(2) 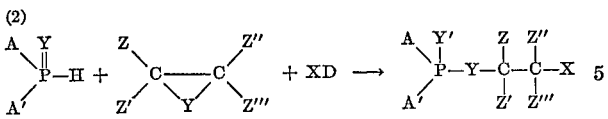

However, in practice, and particularly if radical D of compound XD used comprises halogen atoms, hydride HD may react in turn by one or several of the halogen atoms of D, thus giving a dihydride or a polyhydride. In this case it is also found that hydride HD spontaneously loses a molecule of halohydric acid, thus giving an olefin. In consequence, as a general rule the formation of a simple hydride HD is not necessarily a feature of the method of the invention.

As compounds V which may be used according to the invention preference is given to phosphorous acid, phosphonous or phosphinous acids (otherwise designated as secondary phosphine oxides), phosphorothioous acid, phosphonothioous or phosphinothioous acids (the latter otherwise designated as secondary phosphine sulfides) and monoesters, or diesters of said acids, or mixtures thereof in which the total number of carbon atoms in A+A' is 2 to 22. Typical compounds are mono- or dimethyl phosphites, mono- or diethyl phosphites, mono- or dipropyl phosphites, diallyl phosphites, bis(2-chloro-ethyl) phosphite, diphenyl phosphite, cyclic or acyclic partial phosphorous esters of halogenated or unhalogenated glycols, triols or polyols, monoethyl N,N-dimethylphosphoramidite, O,O-diethyl phosphorothioite, O,S-diethyl phosphorothioite, O,S-diethyl phosphorodithioite, S,S-diethyl phosphorodithioite, monobutyl methanephosphonite, monoethyl ethanephosphonite, monoethyl benzenephosphonite, 2-chloroethyl benzenephosphonite, monobutyl p-chlorobenzene - phosphonite, monophenyl p - dimethylaminobenzenephosphonite, monoethyl p-anisylphosphonite, O-monoethyl methanephosphonothioite, S-monoethyl methanephosphonothioite, O-monoethyl benzenephosphonothioite, S-monoethyl benzenephosphonothioite; dimethylphosphinous, diethylphosphinous, diphenylphosphinous, di(p-chlorophenyl)phosphinous, di(p-tolyl)phosphinous, di (2,4-xylyl)phosphinous, bis (2,4,6-trimethyl phenyl)phosphinous, bis (2,3,5,6 - tetramethylphenyl) phospinous and bis (2,3,4,5,6-pentamethylphenyl)phosphinous acid; dimethylphosphinothioous, dioctylphosphinothioous, and di(p-chlorophenyl)phosphinothioos acids; 10-hydroxy 5,10-dihydrophenophosphazine, and the like.

Compound V may also possibly be used in admixture with compounds containing no phosphorus or with phosphorus containing compounds which do not comprise radical >PY'H and more particularly trivalent phosphorus esters such as, for example, phosphorus acid triesters or phosphorothioous acid triesters, phosphonous acid diesters or phosphonothioous acid diesters, phosphinous acid monoesters or phosphinothioous acid monoesters; in the latter cases, during the reaction, the said esters of trivalent phosphorus may either remain unchanged or be converted respectively into phosphonic or phosphonothioic diesters, phosphinic or phosphinothioic monoesters or into tertiary phosphine oxides or sulfides by thermal isomerisation or Michaelis-Arbuzov condensation with the haloalkyl esters of the type represented by hereinabove Formula I and originating from the phosphorus constituents comprising radical >PY'H.

The compound VI used is preferably taken from among ethylene oxide, propylene oxide, butylene oxide, styrene oxide, glycidyl esters or ethers, vinylcyclohexene mono- or dioxides, dicyclopentadiene mono- or dioxides, dipentene mono- or dioxides, epihalohydrins, epoxidized oils and fatty esters, epoxy resins, ethylene episulfide, propylene episulfide, and the like. The total number of carbon atoms in Z+Z'+Z''+Z''' is not more than 10.

Compound XD is preferably a polyhaloalkane containing 1 to 5 carbon atoms in which at least two of the halogen atoms are carried by the same carbon atom. Typical examples of such polyhaloalkanes are tetrachloromethane, trichlorobromomethane, dichlorodibromomethane, chlorotribromomethane, tetrabromomethane, chloroform, bromoform, iodoform, dichloromethane, dibromomethane, diiodomethane, hexachloroethane, hexabromoethane, pentachloroethane, pentabromoethane, pentabromomethane, 1,1,1,2-tetrachloroethane, 1,1,1,2-tetrabromoethane, 1,2-dibromo - 1,1,2,2 - tetrachloroethane, octachloropentane, decachlorobutane, hexachloropropane, 1,1,2-trichloro-1-fluoroethane, 1,1,2,2-tetrachloro-1,2-difluoroethane, 1,1,2-trichloro - 1,2,2 - trifluoroethane, ethyl trichloroacetate, chloral and acetals thereof, acetonechloroform and the like.

The respective quantities of constituents of the reaction according to the invention are not critical. Compound V containing radical >PY'H and the epoxy compound VI are preferably used in stoichiometric proportion, whilst halide XD is used in excess.

The condensation according to the invention is generally carried out at atmospheric pressure, but pressures lower or higher than normal may be used, preferably pressures not exceeding 25 atmospheres.

It is not essential to use a catalyst, but in practice it is very advantageous to do so in order to increase the speed of reaction. Catalysts which may be used according to the invention are, e.g. anhydrous halohydric acids, halides of polyvalent metals such as aluminum, titanium, zirconium, antimony, lead, iron zinc, cadmium, nickel, cobalt, tin, hafnium, as well as organo-metallic compounds, possibly halogenated, derived from the same metals, such as tetrabutyl tin, dibutyl tin chloride, phenyl tin trichloride, tetrabutyl titanate, aluminum triethoxide and the like. The quantity of catalyst used does not usually exceed 2% of the total weight of reactives and should preferably be between 0.05 and 0.5% in relation to the weight of the reaction mixture.

If desired, condensation according to the invention may take place in an inert solvent which may be taken, for example, from among the non-reactive alkyl or arylhalides, ether-oxides, esters, and the like. An excess of halide XD may also be used as a solvent.

The invention allows esters of pentavalent phosphorus acids to be prepared easily and directly, and in particular definite mixed 2-haloalkyl phosphates. Such esters can find use as solvents, hydraulic fluids, plasticizers for synthetic plastics, additives for lubricants, fireproofing agents, anti-frothing agents, intermediary products, insecticides, fungicides and the like.

It is also possible to obtain according to the invention polyesters of pentavalent phosphorus acids and polyols which may contain particular atoms or radicals such as Cl, OH, etc., and which may be used as glues, additives for lubricants, basic polyhydroxylated materials for the manufacture of polyester or polyurethane resins, polymeric plasticizers, and the like.

The new process can also be used for the phosphorylation of substances comprising epoxy groups such as epoxidized oils, "epoxy" resins, monomeric or polymeric glycidic esters, and the like, in order to impart the same with particular properties such as improved resistance to flame, increased polarity, affinity for certain dyes, lubricating qualities, adhesive qualities and the like.

Furthermore, the invention may be used to eliminate secondary phosphites or other organophosphorus compounds comprising radical >PY'H from their mixtures with compounds containing no phosphorus or compounds which contain phosphorus but do not comprises radical >PY'H. For example, when a tertiary phosphite $(RO)_3P$ is condensed with a haloalkane R'X, a certain quantity of secondary phosphites $(RO)_2POH$ sometimes form alongside the phosphate $R'PO(OR)_2$ resulting from the normal Michaelis-Arbuzov reaction, which results in the final product having reducing properties and an undesirable sensitivity to hydrolysis.

In such cases simultaneous or subsequent treatment of the reactional mixture by an epoxide IV and a halogenated compound XD according to the invention allows the secondary phosphites to be transformed into phosphoric esters which no longer have the same drawbacks.

EXAMPLE 1

Diethyl β-chloroethyl phosphate 41.4 g. (0.3 mole) diethylphosphate (phosphonate) $(C_2H_5O)_2PHO$ were placed in an autoclave along with 186 g. (1.2 mole) tetrachloromethane and 15.8 g. (0.36 mole) ethylene oxide. The mixture was cooled to 0° C. and 3 drops of titanium tetrachloride were added. The autoclave was then closed, kept in cold during 3 hours and then heated for another 3 hours at 100° C., whereafter it was cooled and opened. The contents of the autoclave was distilled first at atmospheric pressure and then under a vacuum.

A fraction weighing 49.2 g. (yield=76%) was collected at 103–106° C. (0.5 mm. Hg.) Table I hereafter shows that said fraction was diethyl β-chloroethyl phosphate $(C_2H_5O)_2PO(OCH_2CH_2Cl)$.

TABLE I

| $(C_2H_5O)_2PO(OC_2H_4Cl)$ | Percent P | Percent Cl | $n_D^{25}$ | $d_4^{25}$ | Molar refraction (MR) | Combined $H_3PO_3$ percent | Combined $H_3PO_4$ percent |
|---|---|---|---|---|---|---|---|
| Found | 14.05 | 15.43 | 1.4270 | 1.1874 | 46.79 | 0.54 | 41.8 |
| Calculated | 14.35 | 16.4 | | | 46.765 | 0 | 45.3 |

EXAMPLE 2

Example 1 was repeated without use of titanium tetrachloride. Diethyl-β-chloroethyl phosphate was again obtained but with a yield of 5% only.

EXAMPLE 3

Diethyl chloropropyl phosphate 41.4 g. (0.3 mole) diethylphosphite were treated as in Example 1, with 93 g. (0.6 mole) tetrachloromethane, 20.9 g. (0.36 mole) propylene oxide and 3 drops of titanium tetrachloride with the only difference that the hot treatment step was carried out at 120° C. during 3 hours. Distillating of the raw product under vacuum yielded a fraction of 20.5 g. collected at 92–100° C. (0.4 mm. Hg.), which as shown in Table II hereafter was diethyl chloro-propyl phosphate presumably formulating as $(C_2H_5O_2)_2PO(OCH_2CHClCH_3)$.

TABLE II

| $(C_2H_5O)_2PO(OC_3H_6Cl)$ | Percent P | Percent Cl | $n_D^{25}$ | $d_4^{25}$ | MR |
|---|---|---|---|---|---|
| Found | 12.85 | 15.37 | 1.4293 | 1.1680 | 51.0 |
| Calculated | 13.44 | 15.40 | | | 51.38 |

EXAMPLE 4

Diethyl-dichloropropyl phosphate

The reaction of Example 3 was repeated using 33.3 g. (0.36 mole) glycerol epichlorhydrin instead of propyleneoxide. Disstillation under vacuum yielded at 118–120° C. (1.35 mm. Hg.) a fraction weighing 23.9 g. which, as shown by Table III hereafter was identified as pure diethyldichloropropyl phosphate presumably formulating as $(C_2H_5O)_2P(O)OCH(CH_2Cl)_2$.

TABLE III

| $(C_2H_5O)_2P(O)OC_3H_5Cl_2)$ | Percent P | Percent Cl | $n_D^{25}$ | $d_4^{25}$ | MR |
|---|---|---|---|---|---|
| Found | 11.92 | 25.89 | 1.4481 | 1.2772 | 55.57 |
| Calculated | 11.69 | 26.79 | | | 56.24 |

EXAMPLE 5

Diethyl-β-bromoethyl phosphate 41.4 g. (0.3 mole) diethylphosphite, dissolved in 100 ml. anhydrous peroxide free ethyl ether and cooled to 0° C., were added with 15.8 g. (0.36 mole) ethylene oxide, then with 59.5 g. (0.3 mole) trichlorobromomethane and finally with 5 drops titanium tetrachloride. The mixture was allowed to react at room temperature for 45 hours and then distilled under reduced pressure. A 16.5 g. fraction was collected at 124–125° C. (1 mm. Hg), the analysis of which agreed with the formula $$(C_2H_5O)_2PO(OCH_2CH_2Br)$$

as shown in Table IV hereafter.

TABLE IV

| $(C_2H_5O)_2PO(OC_2H_4Br)$ | P, percent | Br, percent Volumetric | Br, percent Gravimetric | $n_D^{25}$ | $d_4^{25}$ | MR |
|---|---|---|---|---|---|---|
| Found | 12.22 | 30.04 | 29.0 | 1.4430 | 1.3750 | 50.36 |
| Calculated | 11.87 | 30.65 | 30.65 | | | 49.6 |

The agreement between the result of both the volumetric and gravimetric bromine argentometric titration shows that the halogen contained in the condensate is effectively bromine.

EXAMPLE 6

Diphenyl-β-chloroethyl phosphate 62 g. (0.2 mole) triphenylphosphite were heated under agitation with 8.2 g. (0.1 mole) phosphorous acid, during 1 hour at 70° C. to produce 0.3 mole crude diphenylphosphite; said diphenylphosphite was placed in an autoclave along with 19.8 g. (0.45 mole) ethylene oxide, 93 g. (0.6 mole) tetrachloromethane and 3 drops zirconium tetrachloride. The autoclave was closed and heated at 100° for 3 hours. It was then cooled, opened and the crude product was distilled under reduced pressure. 12.7 g. pure $(C_6H_5O)_2PO(OCH_2CH_2Cl)$ were obtained, B.P.=175–178° C. (0.5–1 mm. Hg):

TABLE V

| $(C_6H_5O)_2PO(OC_2H_4Cl)$ | Percent P | Percent Cl | $n_D^{18.6}$ | $d_4^{18.6}$ | MR |
|---|---|---|---|---|---|
| Found | 10.11 | 11.39 | 1.5240 | 1.2655 | 75.7 |
| Calculated | 9.92 | 11.37 | | | 76.50 |

EXAMPLE 7

Chloro-pentaerythritol, polypropyleneglycol and chloroethyl mixed phosphate-phosphonate (phosphorus and chlorine containing polyol)

A raw mixture of secondary and tertiary phosphites (P%=16.37, Cl%=7.12) was first prepared by reacting 1224 g. dry pentaerythritol with 1237 g. phosphorus trichloride.

50 g. of said mixed phosphites were placed in a pressure reactor along with 50 g. polypropyleneglycol (mean MW=200), 18 g. ethylene oxide, 30.7 g. tetrachloromethane and 5 drops titanium tetrachloride. The reactor was closed and then heated and shaken at 120° C. for 10 hours during which time the dialkyl (secondary) phosphites were converted to dialkyl chloroethylphosphates and the trialkyl (tertiary) phosphites were converted to phosphonic acid esters, according to the well known Michaelis-Arbuzov reaction. Eventually the volatile matters were distilled under vacuum at 100° C. The residue was a gold yellow viscous oil, P%=8.74; Cl%=5.13; acid value=0.10 (mg. KOH/g.); hydroxyl value=320; phosphorous acid esters (expressed as elemental phosphorus)=1.63.

EXAMPLE 8

Ethyl β-chloroethyl benzenephosphonate 12 g. (0.07 mole) ethyl hydrogen benzenephosphonite $C_6H_5$—P(O)H($OC_2H_5$) were placed in an autoclave along with 6.6 g. (0.15 mole) ethylene oxide, 54.5 g. (0.35 mole) tetrachloromethane and 3 drops titanium tetrachloride. The mixture was allowed to react at atmospheric temperature during 3 hours and then heated for 3½ hours at 100° C. under pressure.

By fractionally distilling the crude product, 12 g. (yield=69%) $C_6H_5$—PO($OC_2H_5$)($OCH_2CH_2Cl$) were obtained, B.P.=130–135° C. (0.5–0.6 mm. Hg).

TABLE VI

| $C_6H_5$—PO($OC_2H_5$)($OC_2H_4Cl$) | Percent | | $n_D^{25}$ | $d_4^{25}$ | MR |
|---|---|---|---|---|---|
| | P | Cl | | | |
| Found | 12.28 | 13.91 | 1.5091 | 1.220 | 60.65 |
| Calculated | 12.48 | 14.3 | | | 60.51 |

EXAMPLE 9

Diethyl β-chloroethyl phosphorothionate

A mixture of 30 g. (0.195 mole) O,O-diethyl phosphorothioite $(C_2H_5O)_2PHS$, 17.2 g. (0.39 mole) ethylene oxide, 140 g. (0.91 mole) tetrachloromethane and 2 drops titanium tetrachloride was allowed to react overnight at atmospheric temperature and then heated in an autoclave at 100° C. during 3 hours 50 mn. After cooling, the autoclave was opened; the nasty odour of diethylphosphorothioite had disappeared. The crude product was twice fractionally distilled under reduced pressure, yielding a 9 g. fraction, the characteristics of which agreed fairly with the formula $(C_2H_5O)_2PS(OC_2H_4Cl)$ and with the literature:

TABLE VII

| $(C_2H_5O)_2PS(OC_2H_4Cl)$ | Percent | | B.P./mm. Hg | $n_D^{20}$ | $d_4^{20}$ | MR |
|---|---|---|---|---|---|---|
| | P | Cl | | | | |
| Found | 12.5 | 16.2 | 61.9/0.45 | 1.4660 | 1.1797 | 54.65 |
| Calculated or lit | 13.33 | 15.27 | [1] 107–121/4–5 | [1] 1.4652 | | 54.23 |

[1] V. G. Pesin and A. M. Khaletskii, Zhurnal Obshechej Khimii 1961, 31, 2508

The obtained compound was further characterized and the "thionate" structure thereof confirmed by preparation of a double salt, through heating it with two equivalents of $HgI_2$ at 130–135° C., whereby $[(C_2H_5O)_2PS(OC_2H_4Cl), 2HgI_2]$ was obtained in the form of yellow needles which, after three recrystallizations from methanol, melted at 97–98° C.

EXAMPLE 10

10-oxo, 10-chloroethoxy, 5, 10-dihydrophenophosphazine 21.5 g. (0.092 mole) 10-hydroxy 5,10-dihydrophenophosphazine monohydrate, 9 gr. (0.025 mole) ethylene oxide, 72 g. (0.47 mole) tetrachloromethane and 3 drops titanium tetrachloride were heated together at 100° C. for 3½ hours in an autoclave. After evaporating the volatile components, a hard, solid crude residue was obtained, M.P.=60–70° C., the analysis of which (P%=11.18; Cl%=7.73; N%=4.76; calculated, resp.=10.55–12.10 and 4.77%) agreed with the hypothesis of an incomplete reaction according to:

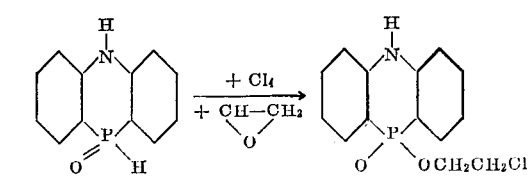

EXAMPLE 11

β-chloroethyl bis(2,4,6-trimethyl phenyl) phosphinate: $C_{20}H_{26}ClO_2P$

Bis (2,4,6-trimethyl phenyl)phosphinous acid $[(CH_3)_3C_6H_2]_2$

PHO was prepared by condensation of mesitylene with phosphorus trichloride, according to A. W. Frank, Journal of Organic Chemistry, 1959, 24, 966. Said compound was obtained as a vitreous, substantially colorless mass having the following characteristics (unpublished up to the present time)

B.P.=220–230° C. (0.60–0.65 mm. Hg)
$n_D^{50}$=1.5900, $d_4^{50}$=1.0788
P%=10.30 (theory=10.83)

Reducing phosphorus (oxidation by alcoholic iodine) =9.85%, Cl%=0.83.

25.5 g. (0.089 mole) of said compound were placed in an autoclave along with 12.8 g. (0.29 mole) ethylene oxide, 80 g. (0.52 mole) tetrachloromethane and 5 drops titanium tetrachloride and the mixture was heated under pressure at 95–105° C. during 4 hours 40 mn. After cooling the contents of the autoclave was evaporated to constant weight (28 g.) The residue (which no longer reduced alcoholic iodine) was dissolved in a 1/1 mixture of benzene and hexane; the solution, separated from an insoluble unknown solid by filtration, was evaporated to constant weight to yield a liquid viscous residue of crude $[(CH_3)_3C_6H_2]_2PO(OCH_2CH_2Cl)$: P%=8.37; Cl%=7.86; acid value=0 (calculated for $C_{20}H_{26}ClO_2P$: P%=8.51, Cl%=9.74.

EXAMPLE 12

The process of Example 8 was repeated, using 150 g. diethyl phosphite, 500 g. epoxidized soybean oil containing 5.71% oxiranic oxygen, 250 g. tetrachloromethane and 4 gr. tin tetrachloride. The mixture was left at rest for 24 hours at room temperature, then heated for 8 hours at 100° C., then for 2 hours at 120° C. and finally for 1 hour at 140° C. After cooling, the autoclave was opened and the volatile components were evaporated under vacuum. 685 gr. of an oily residue were obtained, P%=4.91; Cl%=5.33. Said product is effective as an unctuousness additive for lubricant.

Although our present invention has been more particularly disclosed in the above examples of preferred embodiments it will be apparent to anyone skilled in the art that various modifications may be made thereto without departing from the spirit and scope thereof.

What we claim is:

1. A method for the manufacture of esters of pentavalent phosphorus acids of the formula

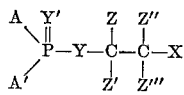

wherein A and A' are selected from the group consisting of alkyl, alkoxy, monocyclic aryl and monocyclic aryloxy, the total number of carbon atoms in A+A' being 2 to 22, Y and Y' are selected from the group consisting of oxygen and sulfur, Z, Z', Z" and Z'" being selected from the group consisting of hydrogen, alkyl and chloroalkyl, the total number of carbon atoms in Z+Z'+Z"+Z'" being not more than 10 and X is a halogen selected from the group consisting of chlorine and bromine which comprises the steps of condensing at a temperature of 0° to 250° C. a compound containing the radical >P—Y'—H selected from the tautomeric forms of the group consisting of

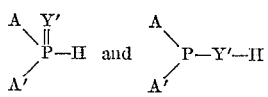

wherein A, A' and Y' have the above definitions with a compound of the formula

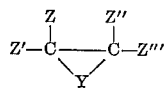

wherein Y, Z, Z', Z" and Z'" have the above definitions and with a halogenated compound of the formula

XD wherein X is selected from the group consisting of chlorine and bromine and D is an alkyl of 1 to 5 carbon atoms having at least one halogen selected from the group consisting of chlorine and bromine, whereby an impure reaction product is obtained and distilling said esters of pentavalent phosphorus acids from said impure reaction product.

2. The method as claimed in claim 1, wherein said compound containing radical >PY'H is a phosphorus acid ester.

3. The method as claimed in claim 1, wherein said compound containing radical >PY'H is a phosphonous acid monoester.

4. The method as claimed in claim 1, wherein said compound containing radical >PY'H is a phosphinous acid.

5. The method as claimed in claim 1, wherein said compound containing radical >PY'H is a phosphorothioous acid ester.

6. The method as claimed in claim 1, wherein said halogenated compound XD is a polyhaloalkane containing 1 to 4 carbon atoms and in which at least two halogen atoms are carried by the same carbon atom.

7. The method as claimed in claim 1, wherein said compound having the formula

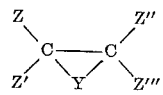

is a member selected from the group consisting of ethylene oxide, propylene oxide, butylene oxide, styrene oxide, glycidyl esters, glycidyl ethers, vinylcyclohexenemonooxides, vinylcyclohexenedioxides, dicyclopentadienemonooxides, dicyclopentadienedioxides, dipentenemonooxides, dipentenedioxides, epihalohydrins, epoxidised fatty esters, ethylene episulfide and propylene episulfide.

8. A method for the manufacture of mixed phosphoric-phosphonic esters of chlorinated pentaerythritol, polypropylene glycol and chloroethyl which comprises the steps of reacting one mole of phosphorus trichloride with about 0.75 to 2 moles of pentaerythritol, whereby a mixture of secondary and tertiary chlorinated pentaerythrite phosphites is obtained, dissolving said mixture in a substantially equal weight of a polypropyleneglycol of a molecular weight comprised between 134 and 308, adding tetrachloromethane and ethylene oxide thereto and heating the resulting mixture at substantially 120° C. in the presence of titanium tetrachloride as catalyst, whereby a reaction product containing volatile substances is obtained, and distilling said reaction product to expel said volatile substances.

9. A mixed, chlorinated pentaerythrite, polypropylene glycol and chloroethyl phosphate-phosphonate prepared according to the method of claim 8.

References Cited

UNITED STATES PATENTS 3,100,220  8/1963  Smith _____ 260—963
3,206,495  9/1965  McBee et al. _____ 260—963

FOREIGN PATENTS 1,133,060  1960  U.S.S.R.

OTHER REFERENCES

Cram et al., "Organic Chemistry," Second Edition, McGraw-Hill, New York, p. 250, 1964.

CHARLES B. PARKER, *Primary Examiner.*

ANTON H. SUTTO, *Assistant Examiner.*

U.S. Cl. X.R.

252—32.5, 77; 260—30.6, 45.7, 403, 927, 936, 959, 961, 970